(12) United States Patent
Sun et al.

(10) Patent No.: US 11,696,235 B2
(45) Date of Patent: Jul. 4, 2023

(54) UPLINK POWER CONTROL PARAMETER CONFIGURATION METHOD, TERMINAL AND NETWORK DEVICE

(71) Applicant: VIVO MOBILE COMMUNICATION CO., LTD., Guangdong (CN)

(72) Inventors: Xiaodong Sun, Chang'an Dongguan (CN); Xueming Pan, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 183 days.

(21) Appl. No.: 16/962,202

(22) PCT Filed: Dec. 27, 2018

(86) PCT No.: PCT/CN2018/124241
§ 371 (c)(1),
(2) Date: Jul. 14, 2020

(87) PCT Pub. No.: WO2019/141057
PCT Pub. Date: Jul. 25, 2019

(65) Prior Publication Data
US 2021/0068058 A1    Mar. 4, 2021

(30) Foreign Application Priority Data

Jan. 16, 2018 (CN) .......................... 201810041384.X

(51) Int. Cl.
*H04W 52/14* (2009.01)
*H04L 41/0803* (2022.01)
(Continued)

(52) U.S. Cl.
CPC ....... *H04W 52/146* (2013.01); *H04L 41/0803* (2013.01); *H04W 52/08* (2013.01);
(Continued)

(58) Field of Classification Search
CPC . H04W 52/146; H04W 52/08; H04W 52/242; H04W 52/325; H04W 72/04;
(Continued)

(56) References Cited

U.S. PATENT DOCUMENTS

2008/0233993 A1*  9/2008  Koo .................. H04W 52/40
                                                                  455/522
2011/0195735 A1   8/2011  Irmer et al.
(Continued)

FOREIGN PATENT DOCUMENTS

CN    103096448 A    5/2013
CN    104285479 A    1/2015
(Continued)

OTHER PUBLICATIONS

CATT: "Remaining Aspects of NR Power Control", 3GPP Draft RI-1720215, 3rd Generation Partnership Project (3GPP), Reno, NV, USA (Year: 2017).*
(Continued)

*Primary Examiner* — Jinsong Hu
*Assistant Examiner* — Farideh Madani
(74) *Attorney, Agent, or Firm* — Maschoff Brennan

(57) ABSTRACT

An uplink power control parameter configuration method, a terminal, and a network device are provided. The method includes: receiving a power control parameter set sent by a network device; determining a target parameter configuration index or a target parameter value for a first power control parameter item from the parameter set of the power control parameter item of the power control parameter set; and determining a target transmit power of an uplink channel or an uplink reference signal according to the target parameter configuration index or the target parameter value.

16 Claims, 3 Drawing Sheets

(51) Int. Cl.
  *H04W 52/08* (2009.01)
  *H04W 52/24* (2009.01)
  *H04W 52/32* (2009.01)
  *H04W 72/23* (2023.01)

(52) U.S. Cl.
  CPC ....... *H04W 52/242* (2013.01); *H04W 52/325* (2013.01); *H04W 72/23* (2023.01)

(58) Field of Classification Search
  CPC ... H04W 72/042; H04W 72/10; H04W 52/12; H04W 52/14; H04W 52/32; H04W 52/54; H04W 52/01; H04L 41/0803
  See application file for complete search history.

(56) References Cited

U.S. PATENT DOCUMENTS

| | | | |
|---|---|---|---|
| 2013/0310102 | A1 | 11/2013 | Chao et al. |
| 2017/0048807 | A1* | 2/2017 | Wang ............... H04W 52/383 |
| 2017/0280476 | A1* | 9/2017 | Yerramalli ........ H04W 74/0808 |

FOREIGN PATENT DOCUMENTS

| | | |
|---|---|---|
| CN | 104509180 A | 4/2015 |
| JP | 2013197783 A | 9/2013 |
| KR | 20160022914 A | 3/2016 |

OTHER PUBLICATIONS

CATT, NR Power Control Aspects, 3GPP TSG RAN WG1 RAN1 NR AH#3, R1-1717846, Nagoya, Japan, Sep. 18-21, 2017.
CATT, Remaining Aspects of NR Power Control, 3GPP TSG RAN WG1 Meeting #91, R1-1720215, Reno, NV, USA, Nov. 27-Dec. 1, 2017.
Extended European Search Report issued in corresponding application No. 18900587.9, dated Feb. 8, 2021.
Korean Office Action issued in corresponding application No. 10-2020-7021161, dated Apr. 1, 2021.
CN Office Action in Application No. 201810041384.X dated Mar. 9, 2020.
"General consideration on UL power control design" 3GPP TSG RAN WG1 Meeting NR#3, Sep. 18, 2017.
"Offline summary for AI 6.7 NR UL power control" 3GPP TSG RAN WG1 Meeting NR#3, Sep. 18, 2017.
"Remaining issues on NR UL power control" 3GPP TSG RAN WG1 Meeting #91, Nov. 27, 2017.
Written Opinion and International Search Report in Office Action PCT/CN/2018/124241 dated Jul. 30, 2020.
Japanese Office Action date Oct. 19, 2021 as received in application No. 2020-538944.
"Remaining issues and text proposals on NR UL power control" 3GPP TSG RAN WG1. Meeting AH 1801. R1-1800209 Vancouver, Canada, Jan. 22-26, 2018, VIVO.
"On uplink power control for NR" 3GPP TSG RAN WG1. Meeting#91. R1-1719968. Reno, USA, Nov. 27-Dec. 1, 2017. OPPO.

* cited by examiner

UPLINK POWER CONTROL PARAMETER CONFIGURATION METHOD, TERMINAL AND NETWORK DEVICE

CROSS REFERENCE OF RELATED APPLICATION

The present application is the U.S. national phase of PCT Application PCT/CN2018/124241 filed on Dec. 27, 2018, which claims a priority of Chinese patent application No. 201810041384.X filed on Jan. 16, 2018, which is incorporated herein by reference in its entirety.

TECHNICAL FIELD

The present disclosure relates to the field of communication technologies, and more particularly, to an uplink power control parameter configuration method, a terminal, and a network device.

BACKGROUND

The fifth generation 5G (5th Generation) mobile communication system supports mobile enhanced broadband, low latency, high reliability, and large scale machine communication connection services. In order to meet the requirements of different traffic for performance indicators such as throughput, delay, and reliability, high-frequency and low-frequency carriers are supported, and the uplink supports a more flexible power control mechanism.

For a carrier f of a serving cell c, the Physical Uplink Shared Channel (PUSCH) power control formula is as follows:

$$P_{PUSCH,f,c}(i, j, q_d, l) = $$
$$\min \begin{cases} P_{CMAX,f,c}(i) \\ P_{O_{PUSCH},f,c}(j) + 10\log_{10}(2^\mu \cdot M_{RB,f,c}^{PUSCH}(i)) + \\ \alpha_{f,c}(j) PL_{f,c}(q_d) + \Delta_{TF,f,c}(i) + f_{f,c}(i, l) \end{cases}$$

$P_{PUSCH,f,c}(i,j,q_d,l)$ denotes a target transmit power of PUSCH; $P_{CMAX,f,c}(i)$ represents the maximum transmit power; $P_{O\_PUSCH,f,c}(j)$ and $\alpha_{f,c}(j)$ respectively represent the target received power and the path loss compensation factor of the open-loop power control parameter, the value set of j is configured by a high layer; $M_{RB,f,c}^{PUSCH}(i)$ represents the PUSCH transmission bandwidth, which is related to the subcarrier spacing; $PL_{f,c}(q_d)$ represents a path loss estimation value, and a downlink channel or signal value set to which the path loss calculation reference is made is configured by a high layer; $\Delta_{TF,f,c}(i)$ represents a power compensation amount associated with the modulation and coding scheme; $f_{f,c}(i,l)$ represents a closed-loop power control adjustment value, and l represents different closed-loop power processes; i represents the transmission time interval.

For a carrier f of a serving cell c, the Physical Uplink Control Channel (PUSCH) power control formula is as follows:

$$P_{PUCCH,f,c}(i, q_u, q_d, l) = \min$$
$$\begin{cases} P_{CMAX,f,c}(i) \\ P_{O\_PUCCH,f,c}(q_u) + PL_{f,c}(q_d) + \Delta_{F\_PUCCH}(F) + \Delta_{TF,f,c}(i) + g_{f,c}(i, l) \end{cases}$$

$P_{PUCCH,f,c}(i,j,q_d,l)$ represents the target transmit power of the PUCCH; $P_{CMAX,f,c}(i)$ represents the maximum transmit power; $P_{O\_PUCCH,f,c}(q_u)$ represents the target received power of the open-loop power control parameter, the value set of $q_u$ is configured by a high layer; $PL_{f,c}(q_d)$ represents a path loss estimation value, and a downlink channel or signal $q_d$ value set referred by the path loss calculation reference is configured by a high layer; $\Delta_{F_{PUCCH}}(F)$ represents the power offsets associated with the PUCCH format, different F correspond to different PUCCH formats; $\Delta_{TF,f,c}(i)$ represents a power compensation amount; l represents closed-loop power control adjustments, and $g_{f,c}(i,l)$ represents different closed-loop power processes; i represents the transmission time interval.

For a carrier f of a serving cell c, the Physical Random Access Channel (PRACH) power control formula is as follows:

$$P_{PRACH,f,c}(i) = \min \begin{cases} P_{CMAX,f,c}(i) \\ P_{PRACH,target}(i) + PL_{f,c} \end{cases}$$

$P_{PRACH,f,c}(i)$ represents a target transmit power of PRACH; $P_{CMAX,f,c}(i)$ represents the maximum transmit power; $P_{PRACH,target}(i)$ represents an open loop power control parameter target received power configured by a high layer; $PL_{f,c}$ represents a path loss estimate.

For a carrier f of a serving cell c, the Sounding Reference Signal (SRS) power control formula is as follows:

$$P_{SRS,f,c}(i, q_s, l) =$$
$$\min \begin{cases} P_{CMAX,f,c}(i) \\ P_{O\_SRS,f,c}(q_s) + 10\log_{10}(2^\mu \cdot M_{SRS,f,c}(i)) + \\ \alpha_{SRS,f,c}(q_s) \cdot PL_{f,c}(q_s) + h_{f,c}(i, l) \end{cases}$$

$P_{SRS,f,c}(i, q_s, l)$ represents the target transmit power of the SRS; $P_{CMAX,f,c}(i)$ represents the maximum transmit power; $P_{O\_SRS,f,c}(q_s)$ and $\alpha_{SRS,f,c}(q_s)$ respectively represent the target received power and the path loss compensation factor of the open-loop power control parameter, the value set of $q_s$ is configured by a high layer; $M_{SRS,f,c}(i)$ represents the RS transmission bandwidth, which is related to the subcarrier spacing μ; $PL_{f,c}(q_s)$ represents a path loss estimate; $h_{f,c}(i,l)$ represents closed-loop power control adjustments, l represents different closed-loop power processes, i represents the transmission time interval.

In the related art, the value sets of the open-loop power control parameters involved in the PUSCH, PUCCH, PRACH and SRS power control formulas are configured by a high layer signaling, but the terminal cannot determine the specific value of the open-loop power control parameters, which may cause the uplink power control to be inaccurate, increase the signaling overhead, and further cause the power consumption of the UE to be increased.

SUMMARY

In a first aspect, an uplink power control parameter configuration method is provided in an embodiment of the present disclosure, applied to a terminal side, including:

receiving a power control parameter set sent by a network device, where the power control parameter set includes a parameter set of at least one power control parameter item, and the parameter set of each power control parameter item includes at least one parameter configuration index or parameter value;

determining a target parameter configuration index or a target parameter value for a first power control parameter item from the parameter set of the power control parameter item of the power control parameter set; and determining a target transmit power of an uplink channel or an uplink reference signal according to the target parameter configuration index or the target parameter value.

In a second aspect, a terminal is further provided in an embodiment of the present disclosure, including:

a first receiving module, configured to receive a power control parameter set sent by a network device, where the power control parameter set includes a parameter set of at least one power control parameter item, and the parameter set of each power control parameter item includes at least one parameter configuration index or parameter value;

a first determining module, configured to determine a target parameter configuration index or a target parameter value for a first power control parameter item from the parameter set of the power control parameter item of the power control parameter set; and a second determining module, configured to determine a target transmit power of an uplink channel or an uplink reference signal according to the target parameter configuration index or the target parameter value.

In a third aspect, a terminal is further provided in an embodiment of the present disclosure, including a processor, a memory and a computer program stored in the memory and executable on the processor, where the processor executes the computer program to perform the uplink power control parameter configuration method.

In a fourth aspect, an uplink power control parameter configuration method is further provided in an embodiment of the present disclosure, applied to a network device side, including:

sending a power control parameter set to a terminal, where the power control parameter set includes a parameter set of at least one power control parameter item, and the parameter set of each power control parameter item includes at least one parameter configuration index or parameter value;

receiving an uplink channel or an uplink reference signal sent by the terminal at a target transmit power, where the target transmit power is determined by the terminal according to a target parameter configuration index or a target parameter value of a first power control parameter item in the power control parameter set.

In a fifth aspect, a network device is further provided in an embodiment of the present disclosure, including:

a first sending module, configured to send a power control parameter set to a terminal, where the power control parameter set includes a parameter set of at least one power control parameter item, and the parameter set of each power control parameter item includes at least one parameter configuration index or parameter value;

a third receiving module, configured to receive an uplink channel or an uplink reference signal sent by the terminal at a target transmit power, where the target transmit power is determined by the terminal according to a target parameter configuration index or a target parameter value of a first power control parameter item in the power control parameter set.

In a sixth aspect, a network device is further provided in an embodiment of the present disclosure, including a processor, a memory and a computer program stored in the memory and executable on the processor, where the processor executes the computer program to perform the uplink power control parameter configuration method hereinabove.

In a seventh aspect, a computer readable storage medium is further provided in an embodiment of the present disclosure, where a computer program is stored in the computer readable storage medium, a processor executes the computer program to perform the uplink power control parameter configuration method hereinabove.

BRIEF DESCRIPTION OF THE DRAWINGS

In order to describe the technical solution of some embodiments of the present disclosure more clearly, the drawings, which are required for use in the description of some embodiments of the present disclosure, are briefly described below. Obviously, the drawings in the following description are merely some of the embodiments of the present disclosure, and other drawings may be made from these drawings without any creative work for those skilled in the art.

DETAILED DESCRIPTION

Figure 1:
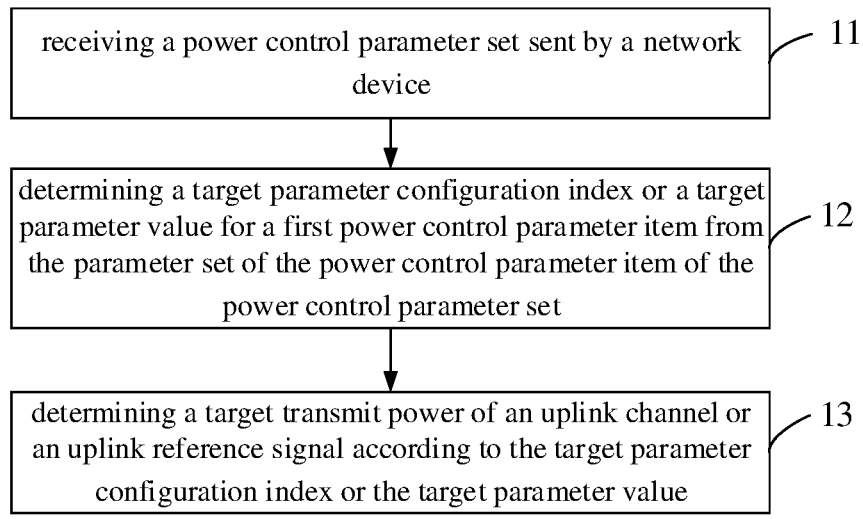
FIG. 1 is a flow chart of an uplink power control parameter configuration method at a terminal side in an embodiment of the present disclosure.

The embodiments of the present disclosure will be described in more detail below with reference to the drawings. While exemplary embodiments of the present disclosure are shown in the drawings, it is to be understood that the disclosure may be implemented in various forms and should not be limited to the embodiments set forth herein. Rather, these embodiments are provided to enable a more thorough understanding of the present disclosure and to convey the scope of the disclosure to those skilled in the art as a whole.

The terms "first" and "second" in the description and claims are to distinguish similar objects. It is to be understood that the data so used are interchangeable where appropriate so that the embodiments of the present application described herein can be implemented, for example, in an order other than those illustrated or described herein. Furthermore, the terms "comprising" and "having", as well as any variations thereof, are intended to cover a non-exclusive inclusion, for example, a process, method, system, product, or apparatus that includes a series of steps or units is not necessarily limited to those steps or units expressly listed, but may include other steps or units not expressly listed or inherent to such process, method, product, or apparatus.

An uplink power control parameter configuration method is provided in an embodiment of the present disclosure, applied to a terminal side. As shown in FIG. 1, the method may include the following steps:

Step 11: receiving a power control parameter set sent by a network device.

The power control parameter set includes a parameter set of at least one power control parameter item, and the parameter set of each power control parameter item includes at least one parameter configuration index or parameter value. That is, the power control parameter set includes parameter sets of different power control parameter items, and a power control parameter item parameter set includes all or part of parameter configuration indexes or parameter values of the power control parameter item. Optionally, the terminal may receive a power control parameter set sent by the network device via a high layer signaling.

In an embodiment of the present disclosure, the power control parameter item includes a target received power, a path loss compensation factor, a reference resource identification of a downlink channel or a reference signal for a pathloss calculation and a process identification of a closed-loop power control, and the like. It is noted that in different scenarios, the types of power control parameter items associated with the power control parameter set are different, and the parameter sets of the power control parameter items included in the power control parameter set are also different.

Step 12: determining a target parameter or a target parameter value for a first power control parameter item from the parameter set of the power control parameter item of the power control parameter set.

It is noted that the first power control parameter item may be one or more power control parameter items in the power control parameter set. It will be appreciated by those skilled in the art that only a first power control parameter item is used as an example for description herein. A person skilled in the art may determine a target parameter configuration index or a target parameter value for a plurality of power control parameter items or all power control parameter items. The first power control parameter item is merely an example and does not constitute a limitation to the present disclosure.

Assuming that the power control parameter set includes a parameter set of power control parameter items such as a target received power, a path loss compensation factor, a reference resource identification of a downlink channel or a reference signal for a pathloss calculation and a process identification of a closed-loop power control, the terminal determines a target parameter configuration index or a target parameter value of the target received power, a target parameter configuration index or a target parameter value of the path loss compensation factor, a target parameter configuration index or a target parameter value of the resource identification of the downlink channel or the reference signal referenced by the path loss calculation, and a target parameter configuration index or a target parameter value of the process identification of closed-loop power control.

Step 13: determining a target transmit power of an uplink channel or an uplink reference signal according to the target parameter configuration index or the target parameter value.

The target parameter configuration index or the target parameter value of the power control parameter item determined in step 12 is substituted into the calculation formula of the target transmit power of the uplink channel or the uplink reference signal, so that the target transmit power of the uplink channel or the uplink reference signal may be determined. In one embodiment, the uplink channel includes at least one of a Physical Uplink Control Channel (PUCCH), a Physical Uplink Shared Channel (PUSCH), and a Physical Random Access Channel (PRACH), the uplink reference signal including a Sounding Reference Signal (SRS).

Taking PUSCH as an example, the power control parameter item associated with the power control parameter set includes a target received power, a path loss compensation factor, a reference resource identification of a downlink channel or a reference signal for a pathloss calculation and a process identification of a closed-loop power control. The power control parameter set configured through the high layer signaling is illustrated as follows:

```
A set of target received power and path loss compensation factors, such as P₀
and α parameter set {
    {P₀ and α parameter configuration index 0, {P_0_0, α _0}},
    {P₀ and α parameter configuration index 1, {P_0_1, α _1}},
    ... }
    A resource identification parameter set of downlink channel or reference
signal for the path loss calculation reference {
    {downlink channel or reference signal resource identification 0 for path loss
calculation reference, Channel State Information Reference Signals (CSI-RS)
identification 0},
    {downlink channel or reference signal resource identification 1 for path loss
calculation reference, CSI-RS identification 1},
    {downlink channel or reference signal resource identification 2 for path loss
calculation reference, Synchronous Signal Block (SSB) identification 0},
    {downlink channel or reference signal resource identification 3 for path loss
calculation reference, SSB identification 1},
    ... }
    closed-loop power control process parameter set {
    {closed-loop power control process 0, 0},
    {Closed loop power control process 1, 1},
    ... }
```

Taking PUCCH as an example, the power control parameter item associated with the power control parameter set includes a target received power, a reference resource identification of a downlink channel or a reference signal for a pathloss calculation and a process identification of a closed-loop power control.

Taking PRACH as an example, the power control parameter item associated with the power control parameter set includes a reference resource identification of a downlink channel or a reference signal for a path loss calculation.

Taking the SRS as an example, the power control parameter item associated with the power control parameter set includes a target received power, a path loss compensation factor, a reference resource identification of a downlink channel or a reference signal for a pathloss calculation and a process identification of a closed-loop power control.

In the following embodiment, step 12 will be described in connection with the specific implementation. The determination of the target parameter configuration index or the target parameter value may be performed independently in different ways listed below, or the determination of the target parameter configuration index or the target parameter value may be performed jointly.

Method 1: determining the target parameter configuration index or the target parameter value for the first power control parameter item according to Downlink Control Information (DCI).

The DCI carries at least one of downlink grant information and uplink grant information. The downlink grant information may indicate power control information of the SRS, and the uplink grant information may indicate power control information of at least one of the PUSCH, the PUCCH, the PRACH, and the SRS.

In one embodiment, the method 1 may further include: detecting whether the DCI includes a target indication field; if the target indication field is detected, determining the target parameter configuration index or the target parameter value for the first power control parameter item according to the target indication field. The target indication field is configured to indicate the parameter configuration index or the parameter value of the first power control parameter item, and the first power control parameter item is at least one of the power control parameter items in the power control parameter set.

The target indication field is coded independently, or the target indication field is jointly coded with other indication field.

For example, the target indication field is coded independently, a specific target indication field of the DCI (or referred to as a power control parameter configuration index field) is configured to indicate a parameter configuration index or a parameter value of a target power control parameter item, and only the parameter configuration index of the target power control parameter item is used as an example in the present embodiment. As shown in Table 1.

TABLE 1

| First indication field | Parameter configuration index of target power control parameter item |
|---|---|
| 00 | 0 |
| 01 | 1 |
| 10 | 2 |
| 11 | 3 |

Different values in the target indication field are configured to indicate parameter configuration indexes of different target power control parameter items, where the target power control parameter item may be one or more of target received power, a path loss compensation factor, a reference resource identification of a downlink channel or a reference signal for a pathloss calculation and a process identification of a closed-loop power control.

When the target indication field is coded independently, before the step of detecting the target indication field in the DCI, the method may further include: receiving indication information sent by the network device and configured to indicate whether the DCI includes a target indication field; if the indication information is detected and the indication information indicates that the DCI includes a target indication field, detecting whether the DCI includes the target indication field; if the indication information is not detected, the target parameter configuration index or the target parameter value of the power control parameter item in the power control parameter set is determined by method 2 or method 3. Specifically, the "indication information is not detected" means that the indication information does not exist, or if it is detected that the indication information indicates that the target indication field does not exist, and the step of determining a default parameter configuration index or a default parameter value of the first power control parameter item as the target parameter configuration index or the target parameter value of the first power control parameter item is performed, the step of determining the target parameter configuration index or target parameter value of the first power control parameter item based on a second power control parameter item whose parameter configuration index or parameter value is determined is performed, where the second power control parameter item is associated with the first power control parameter item. In an embodiment, the terminal may receive, via a high layer signaling, indication information indicating whether a target indication field (or referred to as a power control parameter configuration index field) exists or not, and when the indication information is 0, it is indicated that target indication field does not exist, and when the indication information is 1, it is indicated that target indication field exists.

For example, the target indication field is jointly coded with other indication field, the DCI does not specify an indication field for indicating the parameter configuration index or the parameter value of the target power control parameter item, but indicates the parameter configuration index or the parameter value of the target power control parameter item by multiplexing other defined indication fields. The present embodiment is described by multiplexing SRS request field (target indication field) as an example. As shown in table 2,

TABLE 2

| SRS request field | Description | Power control parameter configuration index |
|---|---|---|
| 00 | SRS indication other than type 1 | 0 |
| 01 | first SRS resource set configured by a high layer | 1 |
| 10 | second SRS resource set configured by a high layer | 2 |
| 11 | third SRS resource set configured by a high layer | 3 |

Different values in the SRS request field may further indicate not only different SRS request resources but also parameter configuration indexes of different target power control parameter items.

Further, in view of a scenario such as a network transmission environment or a terminal DCI failure detection, the terminal DCI failure detection is used as an example to detect whether the DCI includes a target indication field. If the target indication field is not detected, the target parameter configuration index or the target parameter value of the power control parameter item in the power control parameter set is determined by method 2 or method 3. Specifically, if no target indication field is detected, the step of determining the default parameter configuration index or the default parameter value of the first power control parameter item as the target parameter configuration index or the target parameter value of the first power control parameter item is performed if the target indication field does not exist or if the target indication field fails to be detected; or the step of determining the target parameter configuration index or the target parameter value of the first power control parameter item based on a second power control parameter item whose parameter configuration index or parameter value is determined is performed.

Method 2: determining a default parameter configuration index or a default parameter value of the first power control parameter item as the target parameter configuration index or the target parameter value of the first power control parameter item.

The method is in a pre-configuration manner, that is, a protocol or a network device configures a default parameter configuration index or a default parameter value of a power control parameter item under different services in advance. Although the network device configures a power control parameter set through a high layer signaling, the terminal may determine a default parameter configuration index or a default parameter value corresponding to each of the different power control parameter items from the power control parameter set as a target parameter configuration index or a target parameter value of a corresponding power control parameter item. It is assumed that the default parameter configuration index for each power control parameter item is 0.

Method 3: determining the target parameter configuration index or target parameter value of the first power control parameter item based on a second power control parameter item whose parameter configuration index or parameter value is determined.

Prior to the determining the target parameter configuration index or target parameter value of the first power control parameter item based on the second power control parameter item whose parameter configuration index or parameter value is determined, the method further includes: acquiring an association relationship among a plurality of power control parameter items in the power control parameter set. The acquiring the association relationship among the plurality of power control parameter items includes but is not limited to the following: the protocol pre-defines the association relationship among the plurality of power control parameter items, and the network device configures the association relationship among the plurality of power control parameter items for the terminal. In the case that the network device configures the association relationship among the plurality of power control parameter items for the terminal, the terminal may acquire an association relationship among a plurality of power control parameter items through broadcast information of the network device, and may receive the association relationship among the power control parameter items through a high layer signaling.

The association relationship between the plurality of power control parameter items includes a one-to-one, one-to-many, or many-to-one relationship. Take a one-to-one relationship as an example, based on the power control of the beam, {$P_0$ and α parameter configuration index 0, downlink channel or reference signal resource identification 0 for path loss calculation reference, closed-loop power control process 0}. Take a one-to-many relationship as an example, based on the power control of the beam group, {$P_0$ and α parameter configuration index 0, downlink channel or reference signal resource identification 0 of the path loss calculation, downlink channel or reference signal resource identification 1 of the path loss calculation}. Taking the many-to-one relationship as an example, based on the beam group, power control of the carrier, {downlink channel or reference signal resource identification 0 for path loss calculation reference, downlink channel or reference signal resource identification 1 for path loss calculation reference, closed-loop power control process 0}.

The method is an implicit determining method, that is, after determining the target parameter configuration index or the target parameter value of a part of the power control parameter items, the target parameter configuration index or the target parameter value of the other power control parameter items can be determined according to the association relationship among the plurality of power control parameter items. It is assumed that when it is determined that the downlink channel or reference signal resource identification 0 of the path loss calculation reference is used, it is determined that the $P_0$ and α parameter configuration indexes are 0 and the closed-loop power control process is 0.

The above describes a scenario in which a target parameter configuration index or a target parameter value of a power control parameter item is independently determined in three manners, and the following further describes a scenario in which different manners are jointly determined.

In one embodiment, method 2 may be adopted by default, and the DCI in method 1 indicates parameters of some power control parameter items, such as path loss calculation reference downlink channel or reference signal resource identification, and then $P_0$ and α are obtained implicitly by method 3. In another embodiment, the first method may be preferentially used. If the first method cannot determine the target parameter configuration index or the target parameter value of all power control parameter items, the second method or the third method may be used.

Specifically, if only the target parameter configuration index or the target parameter value of a part of the power control parameter items in the power control parameter set is determined by the first method, the target parameter configuration index or the target parameter value of the other power control parameter items may be determined by the third method, that is, the target parameter configuration index or the target parameter value of the other power control parameter items is determined according to the determined association relationship between the part of the power control parameter items and the other power control parameter items. Specifically, after the step of determining the target parameter configuration index or the target parameter value for the first power control parameter item according to the target indication field, the method further includes: determining a target parameter configuration index or a target parameter value of other power control parameter item based on the first power control parameter item, where the other power control parameter item is associated with the first power control parameter item.

In the PUSCH power control procedure, the resource identification (or PL reference RS identification) of the reference channel for the path loss calculation reference is coded with the SRS request field together, that is, the PL reference RS identification is implicitly indicated by the SRS request field, as shown in Table 3, and the high layer signaling is preconfigured the mapping relationship of the PL reference RS identification with the target received power P0 and the path loss compensation factor α as shown in Table 4.

TABLE 3

| SRS request field | Description | PL reference RS identification |
|---|---|---|
| 00 | SRS indication other than type 1 | 0 |
| 01 | first SRS resource set configured by a high layer | 1 |

TABLE 3-continued

| SRS request field | Description | PL reference RS identification |
|---|---|---|
| 10 | second SRS resource set configured by a high layer | 2 |
| 11 | third SRS resource set configured by a high layer | 3 |

TABLE 4

| $P_0$ and $\alpha$ | 2 | 3 | 4 | 5 |
|---|---|---|---|---|
| PL reference RS identification | 0 | 1 | 2 | 3 |

In the PUSCH power control process, the target received power $P_0$ and the path loss compensation factor $\alpha$ are explicitly indicated by the power control parameter configuration index range (in this embodiment, the $P_0$ and $\alpha$ parameter fields are used as an example) in the DCI. As shown in Table 5, the resource identification (or the PL reference RS identification) of the reference channel referred by the path loss calculation is implicitly indicated by the SRS request field, as shown in Table 6. The high layer signaling preconfigures the mapping relationship of the PL reference RS identification with the target received power $P_0$ and the path loss compensation factor $\alpha$ as shown in Table 7.

TABLE 5

| $P_0$ and $\alpha$ parameter fields | $P_0$ and $\alpha$ parameter configuration index |
|---|---|
| 00 | 0 |
| 01 | 1 |
| 10 | 2 |
| 11 | 3 |

TABLE 6

| SRS request field | Description | PL reference RS identification |
|---|---|---|
| 00 | SRS indication other than type 1 | 0 |
| 01 | first SRS resource set configured by a high layer | 1 |
| 10 | second SRS resource set configured by a high layer | 2 |
| 11 | third SRS resource set configured by a high layer | 3 |

TABLE 7

| $P_0$ and $\alpha$ | 0 | 1 | 2-16 | 17-31 |
|---|---|---|---|---|
| PL reference RS index | 0 | 1 | 2 | 3 |

In the uplink power control parameter configuration method of the embodiment of the present disclosure, when a terminal receives a power control parameter set sent by a network device, a target parameter configuration index or a target parameter value of different power control parameter items is determined from the power control parameter set, thereby determining a target transmit power of an uplink channel or an uplink reference signal, improving an accuracy of power control, and reducing a power consumption of the terminal.

The above embodiment describes an uplink power control parameter configuration method in different scenarios, and a terminal corresponding to the uplink power control parameter configuration method is further described below with reference to the drawings.

Figure 2:
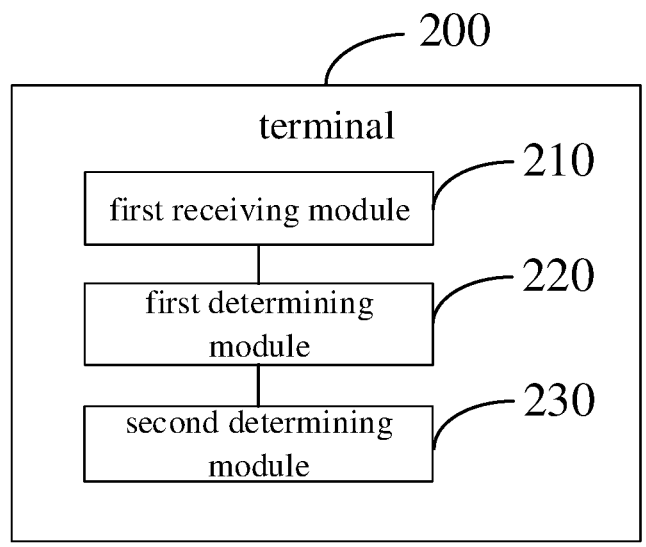
FIG. 2 is a schematic view of a module structure of a terminal in an embodiment of the present disclosure.

As shown in FIG. 2, the terminal 200 in this embodiment of the present disclosure may perform: receiving a power control parameter set sent by a network device; determining a target parameter configuration index or a target parameter value for a first power control parameter item from the parameter set of the power control parameter item of the power control parameter set; determining a target transmit power of an uplink channel or an uplink reference signal according to the target parameter configuration index or the target parameter value, and the same effect is achieved. The terminal 200 specifically includes the following functional modules:

a first receiving module 210, configured to receive a power control parameter set sent by a network device, where the power control parameter set includes a parameter set of at least one power control parameter item, and the parameter set of each power control parameter item includes at least one parameter configuration index or parameter value;

a first determining module 220, configured to determine a target parameter configuration index or a target parameter value for a first power control parameter item from the parameter set of the power control parameter item of the power control parameter set; and a second determining module 230, configured to determine a target transmit power of an uplink channel or an uplink reference signal according to the target parameter configuration index or the target parameter value.

Optionally, the first determining module 220 includes at least one of:

a first determining submodule, configured to determine the target parameter configuration index or the target parameter value for the first power control parameter item according to Downlink Control Information (DCI);

a second determining submodule, configured to determine a default parameter configuration index or a default parameter value of the first power control parameter item as the target parameter configuration index or the target parameter value of the first power control parameter item;

a third determining submodule, configured to determine the target parameter configuration index or target parameter value of the first power control parameter item based on a second power control parameter item whose parameter configuration index or parameter value is determined, where the second power control parameter item is associated with the first power control parameter item.

Optionally, the first determining submodule includes:

a detecting unit, configured to detect whether the DCI includes a target indication field, where the target indication field is configured to indicate the parameter configuration index or the parameter value of the first power control parameter item;

a first determining unit, configured to, if the target indication field is detected, determine the target parameter configuration index or the target parameter value for the first power control parameter item according to the target indication field.

Optionally, the first determining submodule further includes:

a second determining unit, configured to determine a target parameter configuration index or a target parameter value of other power control parameter item based on the first power control parameter item, where the other power control parameter item is associated with the first power control parameter item.

Optionally, the first determining submodule further includes:

a third determining unit, configured to, if the target indication field is not detected, determine the default parameter configuration index value or the default parameter value of the first power control parameter item as the target parameter configuration index or the target parameter value; or determine the target parameter configuration index or target parameter value of the first power control parameter item based on the second power control parameter item whose parameter configuration index or parameter value is determined.

Optionally, the target indication field is coded independently, or the target indication field is jointly coded with other indication field.

Optionally, the terminal 200 further includes:

a second receiving module, configured to, in the case that the target indication field is coded independently, receive indication information sent by the network device and configured to indicate whether the DCI includes a target indication field;

a first processing module, configured to, if the indication information is detected and the indication information indicates that the DCI includes a target indication field, detect whether the DCI includes the target indication field;

a second processing module, configured to, if the indication information is not detected, determine the default parameter configuration index or the default parameter value of the first power control parameter item as the target parameter configuration index or the target parameter value of the first power control parameter item; or determine the target parameter configuration index or target parameter value of the first power control parameter item based on the second power control parameter item whose parameter configuration index or parameter value is determined.

Optionally, the terminal 200 further includes:

a first acquiring module, configured to acquire an association relationship among a plurality of power control parameter items in the power control parameter set.

Optionally, the power control parameter item is one of a target received power, a path loss compensation factor, a reference resource identification of a downlink channel or a reference signal for a pathloss calculation and a process identification of a closed-loop power control.

Optionally, the uplink channel includes at least one of a PUCCH, a PUSCH, and a PRACH, and the uplink reference signal includes a SRS.

It should be noted that when receiving a power control parameter set sent by a network device, the terminal in the embodiment of the present disclosure determines a target parameter configuration index or a target parameter value of different power control parameter items from the power control parameter set, thereby determining a target transmit power of an uplink channel or an uplink reference signal, improving an accuracy of power control, and reducing a power consumption of the terminal.

Figure 3:
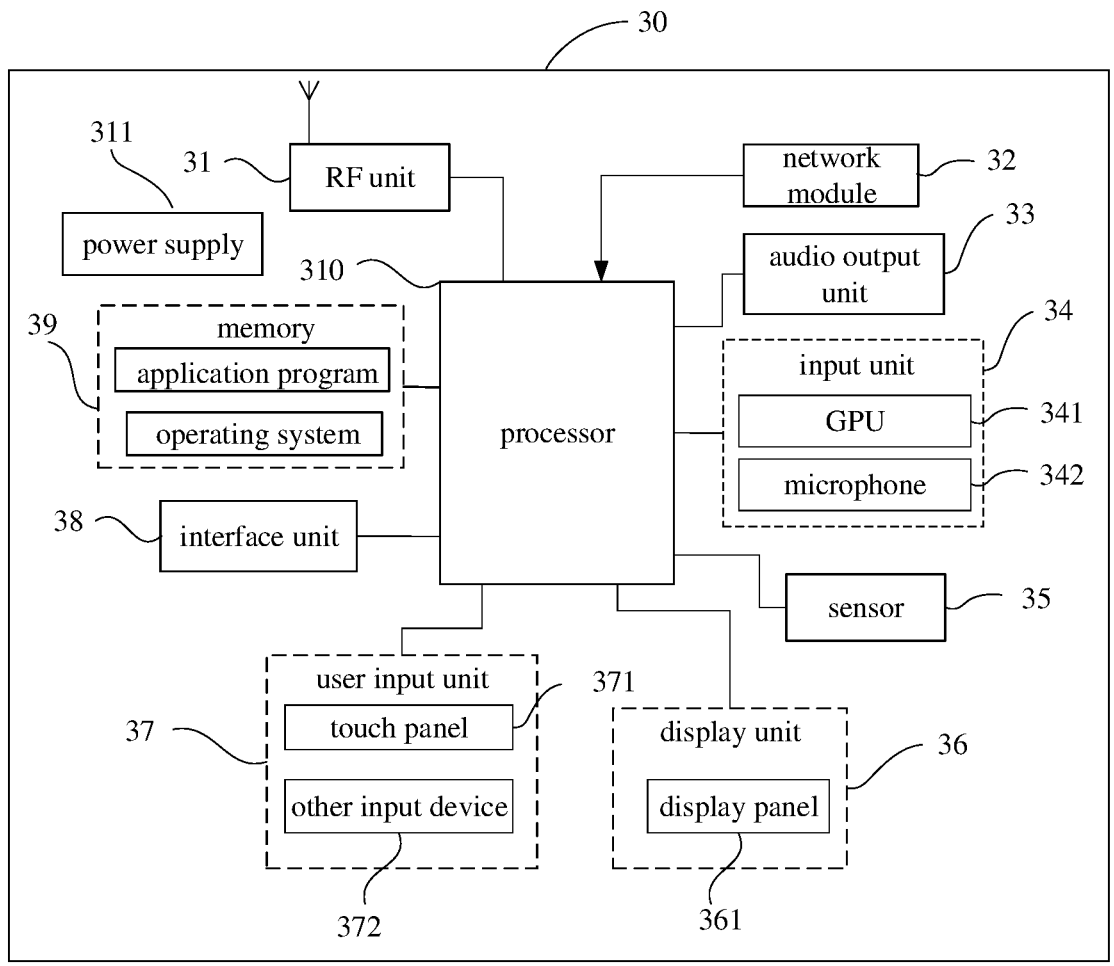
FIG. 3 is a schematic view of a terminal in an embodiment of the present disclosure.

In order to better achieve the above object, further, FIG. 3 is a schematic diagram of a hardware structure of a terminal for realizing various embodiments of the present disclosure. The terminal 30 includes, but is not limited to, a radio frequency unit 31, a network module 32, an audio output unit 33, an input unit 34, a sensor 35, a display unit 36, a user input unit 37, an interface unit 38, a memory 39, a processor 310, and a power supply 311. It will be appreciated by those skilled in the art that the termination structure shown in FIG. 3 does not constitute a limitation on the termination, and that the termination may include more or less components than illustrated, or may combine certain components, or different component arrangements. In the disclosed embodiment, the terminal includes, but is not limited to, a mobile phone, a tablet computer, a notebook computer, a palmtop computer, an in-vehicle terminal, a wearable device, a pedometer, and the like.

The radio frequency unit 31 is configured to receive a power control parameter set sent by a network device, where the power control parameter set includes a parameter set of at least one power control parameter item, and the parameter set of each power control parameter item includes at least one parameter configuration index or parameter value.

The processor 310 is configured to determine a target parameter configuration index or a target parameter value for a first power control parameter item from the parameter set of the power control parameter item of the power control parameter set, determine a target transmit power of an uplink channel or an uplink reference signal according to the target parameter configuration index or the target parameter value.

When receiving a power control parameter set sent by a network device, the terminal in the embodiment of the present disclosure determines a target parameter configuration index or a target parameter value of different power control parameter items from the power control parameter set, thereby determining a target transmit power of an uplink channel or an uplink reference signal, improving an accuracy of power control, and reducing a power consumption of the terminal.

It should be understood that in this embodiment of the present disclosure, the radio frequency unit 31 may be configured to receive and transmit signals during transmission and reception of information or a call. Specifically, the radio frequency unit 31 receives downlink data from a base station and then sends the downlink data to the processor 310 for processing. The uplink data is transmitted to the base station. Generally, the radio frequency unit 31 includes, but is not limited to, an antenna, at least one amplifier, a transceiver, a coupler, a low noise amplifier, a duplexer, and the like. In addition, the radio frequency unit 31 may also communicate with the network and other devices through a wireless communication system.

The terminal provides wireless broadband Internet access to the user through the network module 32, such as assisting the user in receiving and transmitting email, browsing web pages, and accessing streaming media, etc.

The audio output unit 33 may convert the audio data received by the radio frequency unit 31 or the network module 32 or stored in the memory 39 into an audio signal and output as sound. Moreover, the audio output unit 33 may also provide audio output (e.g., call signal reception sound, message reception sound, etc.) related to a specific function performed by the terminal 30. The audio output unit 33 includes a speaker, a buzzer, a receiver, and the like.

The input unit 34 is adapted to receive an audio or video signal. The input unit 34 may include a Graphics Processing Unit (GPU) 341 that processes image data of still pictures or videos obtained by an image capturing device, such as a camera, in a video capturing mode or an image capturing mode, and a microphone 342. The processed image frame may be displayed on the display unit 36. The image frames processed by graphics processor 341 may be stored in memory 39 (or other storage medium) or transmitted via radio frequency unit 31 or network module 32. The microphone 342 may receive sound and can process such sound into audio data. The processed audio data may be converted into a format output that may be transmitted to the mobile communication base station via the radio frequency unit 31 in the case of a telephone talk mode.

The terminal 30 also includes at least one sensor 35, such as a light sensor, a motion sensor, and other sensors. Specifically, the light sensor includes an ambient light sensor that can adjust the brightness of the display panel 361 according to the brightness of the ambient light, and a proximity sensor that can close the display panel 361 and/or backlight when the terminal 30 moves to the ear. As one type of the motion sensor, the accelerometer sensor can detect the magnitude of the acceleration in each direction (generally three axes), can detect the magnitude and direction of the gravity when stationary, and can be configured to recognize the terminal attitude (such as horizontal/vertical screen switching, related games, magnetometer attitude calibration), vibration recognition related functions (such as pedometer, knocking), and the like; The sensor 35 may further include a fingerprint sensor, a pressure sensor, an iris sensor, a molecular sensor, a gyroscope, a barometer, a hygrometer, a thermometer, an infrared sensor, and the like, details thereof are not described herein.

The display unit 36 is configured to display information input by or provided to the user. The display unit 36 may include a display panel 361 that may be configured in the form of a Liquid Crystal Display (LCD), an Organic Light-Emitting Diode (OLED), or the like.

The user input unit 37 may be configured to receive the input number or character information and to generate key signal input related to the user setting and the function control of the terminal. Specifically, the user input unit 37 includes a touch panel 371 and other input devices 372. Touch panel 371, also referred to as a touch screen, may collect touch operations on or near the user (e.g., operations on or near touch panel 371 using any suitable object or accessory, such as a finger, stylus, or the like). The touch panel 371 may include both a touch detection device and a touch controller. The touch detection means detects a touch orientation of the user, detects a signal brought about by the touch operation, and transmits the signal to the touch controller. The touch controller receives touch information from the touch detection device and converts it into contact coordinates, which are then sent to the processor 310 to receive and execute commands from the processor 310. In addition, the touch panel 371 may be implemented in various types such as a resistive type, a capacitive type, an infrared ray, and a surface acoustic wave. In addition to the touch panel 371, the user input unit 37 may also include other input devices 372. Specifically, other input devices 372 may include, but are not limited to, a physical keyboard, a function key (such as a volume control key, an on-off key, and the like), a trackball, a mouse, and a joystick, and details are not described herein.

Further, the touch panel 371 may be overlaid on the display panel 361, and when the touch panel 371 detects a touch operation on or near the touch panel 371, the touch panel 371 transmits the touch panel 371 to the processor 310 to determine a type of a touch event, and then the processor 310 provides a corresponding visual output on the display panel 361 according to the type of the touch event. Although in FIG. 3, the touch panel 371 and the display panel 361 are implemented as two separate components to implement the input and output functions of the terminal, in some embodiments, the touch panel 371 and the display panel 361 may be integrated to implement the input and output functions of the terminal, which are not specifically limited herein.

The interface unit 38 is an interface where an external device is connected to the terminal 30. For example, an external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 38 may be configured to receive input (e.g., data information, power, etc.) from an external device and transmit the received input to one or more elements within the terminal 30 or may be configured to transmit data between the terminal 30 and the external device.

Memory 39 may be configured to store software programs and various data. The memory 39 may mainly include a storage program area and a storage data area, wherein the storage program area may store an operating system, an application program required for at least one function (such as a sound playing function, an image playing function, and the like), and the like; The storage data area may store data (such as audio data, a phone book, and the like) created according to use of the handset, and the like. In addition, memory 39 may include high speed random access memory, and may also include non-volatile memory, such as at least one magnetic disk storage device, flash memory device, or other volatile solid state storage device.

The processor 310 is a control center of the terminal, connects various parts of the entire terminal by various interfaces and lines, executes various functions of the terminal and processes data by running or executing software programs and/or modules stored in the memory 39 and invoking data stored in the memory 39, thereby performing overall monitoring of the terminal. Processor 310 may include one or more processing units. Optionally, the processor 310 may integrate an application processor and a modem processor, wherein the application processor mainly processes an operating system, a user interface, an application program, and the like, and the modem processor mainly processes wireless communication. It will be appreciated that the modem processor described above may also not be integrated into the processor 310.

The terminal 30 may also include a power supply 311 (such as a battery) for supplying power to the various components. Optionally, the power supply 311 may be logically connected to the processor 310 through a power management system so as to perform functions such as managing charging, discharging, and power consumption management through the power management system.

In addition, the terminal 30 includes functional modules not shown, and details thereof are not described herein.

Optionally, a terminal is provided in an embodiment of the present disclosure, including a processor 310, a memory 39, and a computer program stored in the memory 39 and operable on the processor 310. The computer program, when executed by the processor 310, implements various processes of the uplink power control parameter configuration method embodiment, and achieves the same technical effect. To avoid repetition, details are not described herein. Where the terminal may be a wireless terminal or may be a wired terminal, the wireless terminal may be a device providing voice and/or other service data connectivity to the user, a handheld device having a wireless connection function, or other processing device connected to a wireless modem. A wireless terminal may communicate with one or more core networks via a Radio Access Network (RAN), which may be a mobile terminal, such as a mobile phone (or referred to as a "cell phone"), and a computer having a mobile terminal, for example, may be a portable, pocket-sized, handheld, computer-built-in, or in-vehicle mobile device that exchanges language and/or data with the Radio Access Network. For example, a device such as a Personal Communication Service (PCS) telephone, a cordless telephone, a Session Initiation Protocol (SIP) telephone, a Wireless Local Loop (WLL) station, or a Personal Digital Assistant (PDA). The wireless terminal may also be referred to as a system, a Subscriber Unit, a Subscriber Station, a Mobile Station, a Mobile, a Remote Station, a Remote Terminal, an Access Terminal, a User Terminal, a User Agent, and a User Device or User Equipment, and is not limited herein.

A computer readable storage medium is further provided in an embodiment of the present disclosure, where a computer program is stored in the computer readable storage medium, a processor executes the computer program to perform the uplink power control parameter configuration method hereinabove and achieves the same technical effect. To avoid repetition, details are not described herein. The computer readable storage medium includes, for example, a Read-Only Memory (ROM), a Random Access Memory (RAM), a magnetic disk, or an optical disk.

The above embodiment describes the uplink power control parameter configuration method of the present disclosure from the terminal side, and the uplink power control parameter configuration method of the network device side will be further described with reference to the accompanying drawings.

Figure 4:
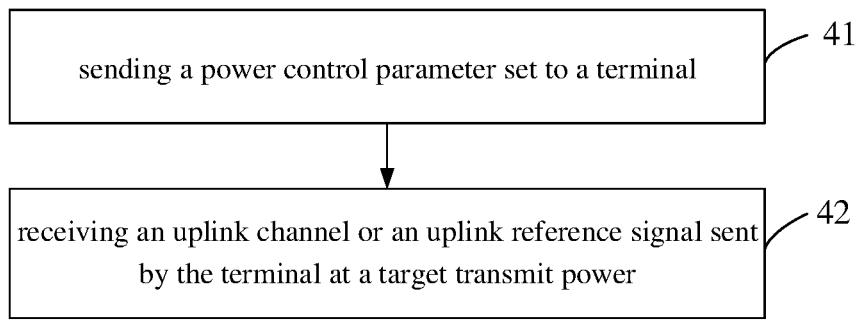
FIG. 4 is a flow chart of an uplink power control parameter configuration method at a network device side in an embodiment of the present disclosure.

The uplink power control parameter configuration method of the embodiment of the present disclosure is applied to a network device side. As shown in FIG. 4, the method includes the following steps:

Step 41: sending a power control parameter set to a terminal.

The power control parameter set includes a parameter set of at least one power control parameter item, and the parameter set of each power control parameter item includes at least one parameter configuration index or parameter value. Optionally, the power control parameter set may be sent by the network device via a high layer signaling.

Optionally, the power control parameter item includes at least one of a target received power, a path loss compensation factor, a reference resource identification of a downlink channel or a reference signal for a pathloss calculation and a process identification of a closed-loop power control.

Step 42: receiving an uplink channel or an uplink reference signal sent by the terminal at a target transmit power.

The target transmit power is determined by the terminal according to the target parameter configuration index or the target parameter value of the first power control parameter item in the power control parameter set. The uplink channel includes at least one of a Physical Uplink Control Channel (PUCCH), a Physical Uplink Shared Channel (PUSCH), and a Physical Random Access Channel (PRACH), the uplink reference signal including a Sounding Reference Signal (SRS).

Optionally, prior to the step 42, the method may further include: sending DCI carrying a target indication field to the terminal, where the target indication field is configured to indicate the parameter configuration index or the parameter value of the first power control parameter item.

In an embodiment, the target indication field is coded independently for indicating a parameter configuration index or a parameter value of the first power control parameter item, or the target indication field is jointly coded with other indication fields, i.e. parameter configuration indexes or parameter values of the first power control parameter item are indicated by multiplexing other defined indication fields.

Taking the target indication field as an example, prior to the step 41, the method may further include: sending, to the terminal, indication information configured to indicate whether the DCI includes a target indication field. Optionally, the network device may send to the terminal the indication information indicating whether the target indication field exists or not through the high layer signaling, and when the indication information is 0, it is indicated that the target indication field does not exist, and when the indication information is 1, it is indicated that the target indication field exists.

Optionally, prior to the step 42, the method further include: sending, to the terminal, an association relationship among a plurality of power control parameter items in the power control parameter set. The association relationship between the plurality of power control parameter items includes a one-to-one, one-to-many, or many-to-one relationship. Optionally, the network device may send the association relationship among the plurality of power control parameter items to the terminal through a high layer signaling, and the network device configures the association relationship among the plurality of power control parameter items to the terminal, so that the terminal may determine the target parameter configuration index or the target parameter value of the other power control parameter items according to the association relationship among the plurality of power control parameter items after determining the target parameter configuration index or the target parameter value of the part of power control parameter items.

According to the uplink power control parameter configuration method of the embodiment of the present disclosure, a network device sends a power control parameter set to a terminal, so that the terminal determines a target parameter configuration index or a target parameter value of different power control parameter items from the power control parameter set, thereby determining a target transmit power of an uplink channel or an uplink reference signal, improving an accuracy of power control, and reducing a power consumption of the terminal.

The above embodiments describe in detail the uplink power control parameter configuration methods in different scenarios, and the following embodiments further describe the corresponding network devices with reference to the accompanying drawings.

Figure 5:
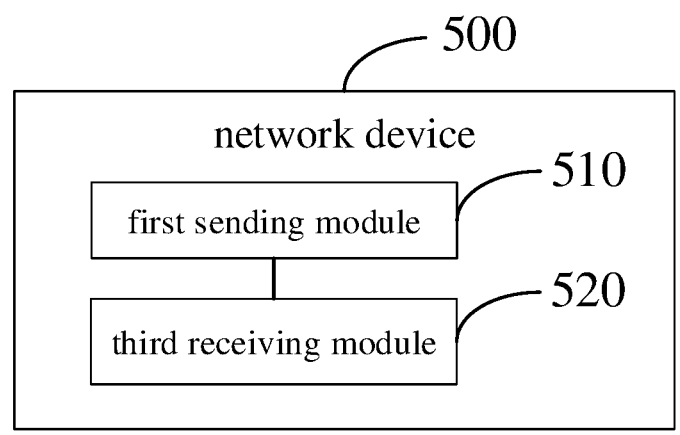
FIG. 5 is a schematic view of a module structure of a network device in an embodiment of the present disclosure.

As shown in FIG. 5, the network device 500 in this embodiment of the present disclosure may perform: sending a power control parameter set to a terminal and receiving an uplink channel or an uplink reference signal sent by the terminal at a target transmit power, and the same effect is achieved. The network device 500 specifically includes the following functional modules:

a first sending module 510, configured to send a power control parameter set to a terminal, where the power control parameter set includes a parameter set of at least one power control parameter item, and the parameter set of each power control parameter item includes at least one parameter configuration index or parameter value;

a third receiving module 520, configured to receive an uplink channel or an uplink reference signal sent by the terminal at a target transmit power, where the target transmit power is determined by the terminal according to a target parameter configuration index or a target parameter value of a first power control parameter item in the power control parameter set.

Optionally, the network device 500 further includes:

a second sending module, configured to send Downlink Control Information (DCI) carrying a target indication field to the terminal, where the target indication field is configured to indicate the parameter configuration index or the parameter value of the first power control parameter item.

Optionally, the target indication field is coded independently, or the target indication field is jointly coded with other indication field.

Optionally, the network device 500 further includes:

a third sending module, configured to, if the target indication field is coded independently, send to the terminal indication information configured to indicate whether the DCI includes a target indication field.

Optionally, the network device 500 further includes:

a fourth sending module, configured to send to the terminal an association relationship among a plurality of power control parameter items in the power control parameter set.

Optionally, the uplink channel includes at least one of a Physical Uplink Control Channel (PUCCH), a Physical Uplink Shared Channel (PUSCH), and a Physical Random Access Channel (PRACH), and the uplink reference signal includes a Sounding Reference Signal (SRS).

It should be noted that the network device according to the embodiment of the present disclosure transmits a power control parameter set to the terminal, so that the terminal determines a target parameter configuration index or a target parameter value of different power control parameter items from the power control parameter set, thereby determining a target transmit power of an uplink channel or an uplink reference signal, improving an accuracy of power control, and reducing a power consumption of the terminal.

It should be noted that the division of the modules of the network device and the terminal is merely a division of a logical function. In actual implementation, all or part of the modules may be integrated into a physical entity or may be physically separated. The modules may all be implemented in the form of software calls through processing elements, or be implemented entirely in hardware. Some of the modules may also be implemented in the form of processing element calls software, and some of the modules may be implemented in the form of hardware. For example, the determination module may be a separately established processing element, or may be integrated in a chip of the above-mentioned device, or may be stored in a memory of the above-mentioned device in the form of program code, and the function of the above-mentioned determination module is invoked and executed by a processing element of the above-mentioned device. Implementations of other modules are similar. In addition, the modules may be integrated in whole or in part, or may be implemented independently. The processing element described herein may be an integrated circuit having signal processing capabilities. In an implementation, the steps of the above-described method or the above-described modules may be performed by integrated logic circuits of hardware in the processor elements or by instructions in the form of software.

For example, the above modules may be one or more integrated circuits configured to implement the above methods, such as one or more Application Specific Integrated Circuit (ASICs), or one or more microprocessors, or one or more digital signal processor (DSPs), or one or more Field Programmable Gate Array (FPGAs), etc. As another example, when one of the above modules is implemented in the form of a processing element scheduling program code, the processing element may be a general purpose processor, such as a Central Processing Unit (CPU) or other processor that may invoke the program code. As another example, these modules may be integrated together in the form of system-on-a-chip (SOC).

In order to better achieve the above object, a network device is further provide in an embodiment of the present disclosure: including a processor, a memory, and a computer program stored in the memory and operable on the processor, where the processor executes the computer program to perform the uplink power control parameter configuration method hereinabove. The disclosed embodiment also provides a computer readable storage medium having stored therein a computer program, where the processor executes the computer program to perform the uplink power control parameter configuration method hereinabove.

Figure 6:
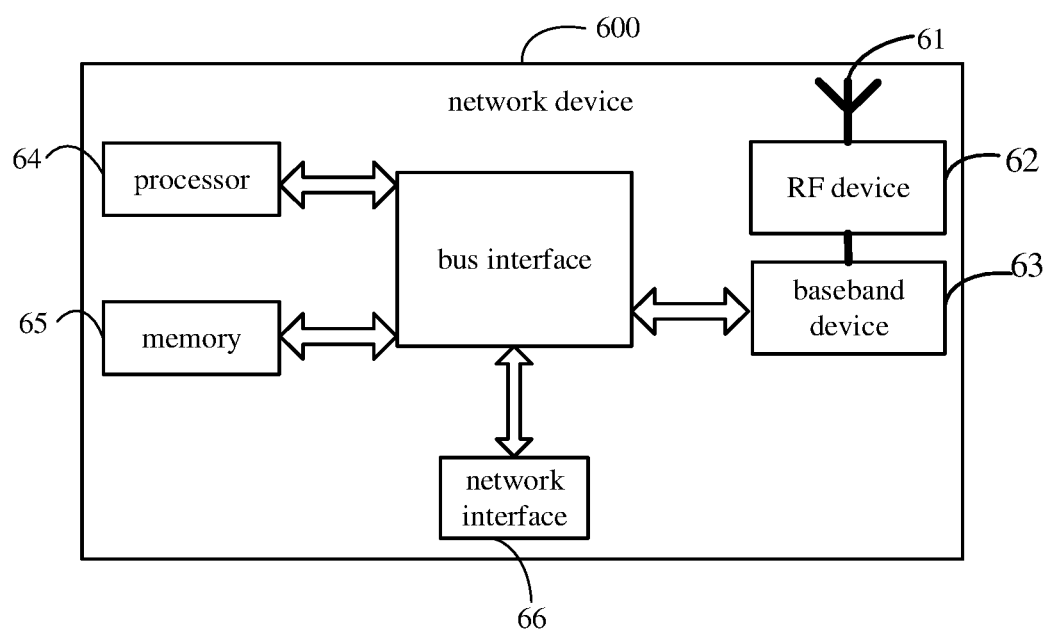
FIG. 6 is a schematic view of a network device in an embodiment of the present disclosure.

Specifically, a network device is further provided in an embodiment of the present disclosure. As shown in FIG. 6, the network device 600 includes an antenna 61, a radio frequency device 62, and a baseband device 63. The antenna 61 is connected to a radio frequency device 62. In the uplink direction, the radio frequency device 62 receives information through the antenna 61 and transmits the received information to the baseband device 63 for processing. In the downstream direction, the baseband device 63 processes the information to be transmitted and transmits the information to the radio frequency device 62. The radio frequency device 62 processes the received information and transmits the information through the antenna 61.

The above-mentioned band processing means may be located in the baseband means 63, and the method performed by the network device in the above-mentioned embodiment may be implemented in the baseband means 63, which comprises a processor 64 and a memory 65.

The baseband device 63 may include, for example, at least one baseband board on which a plurality of chips are provided, as shown in FIG. 6, wherein one of the chips is, for example, a processor 64 connected to the memory 65 to invoke a program in the memory 65 to perform the network device operation shown in the above method embodiment.

The baseband device 63 may also include a network interface 66 for exchanging information with the radio frequency device 62, such as a common public radio interface (CPRI).

The processor herein may be a processor or may be a general term for a plurality of processing elements. For example, the processor may be a CPU or an ASIC, or one or more integrated circuits configured to implement the methods performed by the above network devices, such as one or more microprocessors, or one or more DSPs, or one or more field programmable gate arrays FPGAs, etc. The storage element may be a memory or may be a general term for a plurality of storage elements.

The memory 65 may be volatile memory or non-volatile memory, or may include both volatile and non-volatile memory. The nonvolatile memory may be Read-Only Memory (ROM), Programmable ROM (PROM), Erasable PROM (EPROM), Electrically EPROM (EEPROM), or flash memory. The volatile memory may be a Random Access Memory (RAM), which functions as an external cache. By way of example, and not limitation, many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), and Direct Rambus RAM (DRRAM). The memory 65 described herein is intended to include, but is not limited to, these and any other suitable types of memory.

Specifically, the network device of the embodiment further includes a computer program stored in the memory 65 and operable on the processor 64, which invokes the computer program in the memory 65 to perform the methods performed by the modules shown in FIG. 5.

Specifically, the computer program is called by the processor 64 to: send a power control parameter set to a terminal, where the power control parameter set includes a parameter set of at least one power control parameter item, and the parameter set of each power control parameter item includes at least one parameter configuration index or parameter value;

receive an uplink channel or an uplink reference signal sent by the terminal at a target transmit power, where the target transmit power is determined by the terminal according to a target parameter configuration index or a target parameter value of a first power control parameter item in the power control parameter set.

Specifically, the computer program is called by the processor 64 to: send Downlink Control Information (DCI) carrying a target indication field to the terminal, where the target indication field is configured to indicate the parameter configuration index or the parameter value of the first power control parameter item.

Specifically, the target indication field is coded independently, or the target indication field is jointly coded with other indication field.

Specifically, the computer program is called by the processor 64 to: in the case that the target indication field is coded independently, send to the terminal indication information configured to indicate whether the DCI includes a target indication field.

Specifically, the computer program is called by the processor 64 to: send to the terminal an association relationship among a plurality of power control parameter items in the power control parameter set.

Specifically, the power control parameter item is one of a target received power, a path loss compensation factor, a reference resource identification of a downlink channel or a reference signal for a pathloss calculation and a process identification of a closed-loop power control.

Specifically, the uplink channel includes at least one of a Physical Uplink Control Channel (PUCCH), a Physical Uplink Shared Channel (PUSCH), and a Physical Random Access Channel (PRACH), and the uplink reference signal includes a Sounding Reference Signal (SRS).

The network device may be a Base Transceiver Station (BTS) in Global System of Mobile communication (GSM) or Code Division Multiple Access (CDMA), a NodeB (NB) in Wideband Code Division Multiple Access (WCDMA), an Evolutional Node B (eNB) in LTE, a relay station or an access point, a base station in a future 5G network, or the like, and is not limited herein.

The network device in the embodiment of the present disclosure sends a power control parameter set to a terminal, so that the terminal determines a target parameter configuration index or a target parameter value of different power control parameter items from the power control parameter set, thereby determining a target transmit power of an uplink channel or an uplink reference signal, improving an accuracy of power control, and reducing a power consumption of the terminal.

Those of ordinary skill in the art will recognize that the elements and algorithm steps of the examples described in connection with the embodiments disclosed herein can be implemented in electronic hardware, or a combination of computer software and electronic hardware. Whether these functions are performed in hardware or software depends on the particular application and design constraints of the solution. The skilled artisan may use different methods to implement the described functions for each particular application, but such implementation should not be considered to be outside the scope of the present disclosure.

It will be apparent to those skilled in the art that for the convenience and brevity of the description, reference may be made to the corresponding processes in the foregoing method embodiments for the specific working procedures of the above-described systems, apparatuses and units, and details will not be described herein.

In the embodiments provided herein, it should be understood that the disclosed apparatus and method may be implemented in other ways. For example, the device embodiments described above are merely illustrative, for example, the division of the cells is merely a logical functional division, and there may be additional division in practice, for example, a plurality of cells or components may be combined or integrated into another system, or some features may be ignored or not performed. On the other hand, the coupling or direct coupling or communication connection between each other shown or discussed may be through some interface, indirect coupling or communication connection of a device or unit, and may be in electrical, mechanical or other form.

The elements illustrated as separate elements may or may not be physically separate, and the elements shown as elements may or may not be physical elements, may be located at one location, or may be distributed across multiple network elements. Some or all of the elements may be determined according to actual needs to achieve the objectives of the embodiments.

In addition, the functional units in the various embodiments of the present disclosure may be integrated in one processing unit, may be separate physical units, or may be integrated in two or more units.

The functions, if implemented as software functional units and sold or used as separate products, may be stored in a computer-readable storage medium. Based on such an understanding, the technical solution of the present disclosure may essentially be embodied in the form of a software product that is stored in a storage medium and includes instructions for causing a computer device (which may be a personal computer, a server, or a network device) to perform all or a portion of the steps of the methods described in the various embodiments of the present disclosure. The storage medium includes a USB flash drive, a removable hard disk, a ROM, a RAM, a magnetic disk, or an optical disk.

Furthermore, it should be noted that in the apparatus and methods of the present disclosure, it is evident that the components or steps may be broken down and/or recombined. Such decomposition and/or recombination is to be considered an equivalent of the present disclosure. Moreover, the steps of performing the above-mentioned series of processes may be naturally performed in chronological order in the order described, but it is not necessary to perform the steps necessarily in chronological order, and certain steps may be performed in parallel or independently of each other. It will be appreciated by those of ordinary skill in the art that all or any of the steps or components of the methods and apparatus of the present disclosure may be implemented in hardware, firmware, software, or combinations thereof in any computing device (including a processor, storage medium, etc.) or network of computing devices, as may be accomplished by those of ordinary skill in the art upon reading the description of the present disclosure using their basic programming skills.

The object of the present disclosure can therefore also be achieved by running a program or a set of programs on any computing device. The computing device may be a well-known universal device. Accordingly, the object of the present disclosure may also be achieved by providing a program product containing only program code embodying the method or apparatus. That is, such a program product also constitutes the present disclosure, and a storage medium in which such a program product is stored also constitutes the present disclosure. Obviously, the storage medium may be any known storage medium or any storage medium developed in the future. It should also be noted that in the apparatus and methods of the present disclosure, it will be apparent that the components or steps may be broken down and/or recombined. Such decomposition and/or recombination is to be considered an equivalent of the present disclosure. Moreover, the steps of performing the above-mentioned series of processing may be performed in a chronological order naturally in the order described, but need not necessarily be performed in a chronological order. Certain steps may be performed in parallel or independently of one another.

The description hereinabove is some embodiments of the present disclosure, it should be noted that several modifications and embellishments may be made by those of ordinary skill in the art without departing from the principles set forth herein, and such modifications and embellishments are also within the scope of the present disclosure.

What is claimed is:

1. An uplink power control parameter configuration method, applied to a terminal side, comprising:
   receiving a power control parameter set sent by a network device, wherein the power control parameter set comprises a parameter set of at least one power control parameter item, and the parameter set of each power control parameter item comprises at least one parameter configuration index or parameter value;
   determining the target parameter configuration index or the target parameter value for the first power control parameter item according to Downlink Control Information (DCI); and
   determining a target transmit power of an uplink channel or an uplink reference signal according to the target parameter configuration index or the target parameter value;
   wherein the determining the target parameter configuration index or the target parameter value for the first power control parameter item according to the DCI comprises:
   detecting whether the DCI comprises a target indication field;
   when the target indication field is detected, determining the target parameter configuration index or the target parameter value for the first power control parameter item according to the target indication field, from the parameter set of the power control parameter item of the power control parameter set;
   when the target indication field is not detected, determining the default parameter configuration index or the default parameter value as the target parameter configuration index or the target parameter value of the first power control parameter item; or determining the target parameter configuration index or target parameter value of the first power control parameter item based on the second power control parameter item whose parameter configuration index or parameter value is determined.

2. The uplink power control parameter configuration method according to claim 1, wherein the target indication field is configured to indicate the parameter configuration index or the parameter value of the first power control parameter item.

3. The uplink power control parameter configuration method according to claim 2, wherein subsequent to the determining the target parameter configuration index or the target parameter value for the first power control parameter item according to the target indication field, the method further comprises:
   determining a target parameter configuration index or a target parameter value of other power control parameter item, based on the first power control parameter item, wherein the other power control parameter item is associated with the first power control parameter item.

4. The uplink power control parameter configuration method according to claim 2, wherein the target indication field is coded independently, or the target indication field is jointly coded with other indication field.

5. The uplink power control parameter configuration method according to claim 4, wherein in the case that the target indication field is coded independently, prior to the detecting whether the DCI comprises the target indication field, the method further comprises:
   receiving indication information which is sent by the network device and configured to indicate whether the DCI includes a target indication field;
   when the indication information is detected and the indication information indicates that the DCI comprises a target indication field, detecting whether the DCI comprises the target indication field;
   when the indication information is not detected, determining the default parameter configuration index or the default parameter value of the first power control parameter item as the target parameter configuration index or the target parameter value of the first power control parameter item; or determining the target parameter configuration index or target parameter value of the first power control parameter item based on the second power control parameter item whose parameter configuration index or parameter value is determined.

6. The uplink power control parameter configuration method according to claim 1, wherein prior to the determining the target parameter configuration index or target parameter value of the first power control parameter item based on the second power control parameter item whose parameter configuration index or parameter value is determined, the method further comprises: acquiring an association relationship among a plurality of power control parameter items in the power control parameter set.

7. The uplink power control parameter configuration method according to claim 1, wherein the power control parameter item is one of: a target received power, a pathloss compensation factor, a reference resource identification of a downlink channel or a reference signal for a pathloss calculation and a process identification of a closed-loop power control.

8. The uplink power control parameter configuration method according to claim 1, wherein the uplink channel comprises at least one of a Physical Uplink Control Channel (PUCCH), a Physical Uplink Shared Channel (PUSCH), and a Physical Random Access Channel (PRACH), and the uplink reference signal comprises a Sounding Reference Signal (SRS).

9. A terminal, comprising a processor, a memory and a computer program stored in the memory and executable on the processor, wherein the processor executes the computer program to:

receive a power control parameter set sent by a network device, wherein the power control parameter set comprises a parameter set of at least one power control parameter item, and the parameter set of each power control parameter item comprises at least one parameter configuration index or parameter value;

determining the target parameter configuration index or the target parameter value for the first power control parameter item according to Downlink Control Information (DCI); and determine a target transmit power of an uplink channel or an uplink reference signal according to the target parameter configuration index or the target parameter value;

wherein the processor executes the computer program to perform detecting whether the DCI comprises a target indication field;

when the target indication field is detected, determining the target parameter configuration index or the target parameter value for the first power control parameter item according to the target indication field, from the parameter set of the power control parameter item of the power control parameter set;

when the target indication field is not detected, determining the default parameter configuration index or the default parameter value as the target parameter configuration index or the target parameter value of the first power control parameter item; or determining the target parameter configuration index or target parameter value of the first power control parameter item based on the second power control parameter item whose parameter configuration index or parameter value is determined.

10. The terminal according to claim 9, wherein
the target indication field is configured to indicate the parameter configuration index or the parameter value of the first power control parameter item.

11. An uplink power control parameter configuration method, applied to a network device side, comprising:
sending a power control parameter set to a terminal, wherein the power control parameter set comprises a parameter set of at least one power control parameter item, and the parameter set of each power control parameter item comprises at least one parameter configuration index or parameter value;

sending Downlink Control Information (DCI) carrying a target indication field to the terminal, to enable the terminal to: detect whether the DCI comprises a target indication field; when the target indication field is detected, then determine the target parameter configuration index or the target parameter value for the first power control parameter item according to the target indication field, from the parameter set of the power control parameter item of the power control parameter set; when the target indication field is not detected, then determine the default parameter configuration index or the default parameter value as the target parameter configuration index or the target parameter value of the first power control parameter item; or then determine the target parameter configuration index or target parameter value of the first power control parameter item based on the second power control parameter item whose parameter configuration index or parameter value is determined; and receiving an uplink channel or an uplink reference signal sent by the terminal at a target transmit power, wherein the target transmit power is determined by the terminal according to a target parameter configuration index or a target parameter value of a first power control parameter item in the power control parameter set.

12. The uplink power control parameter configuration method according to claim 11, wherein
the target indication field is configured to indicate the parameter configuration index or the parameter value of the first power control parameter item.

13. The uplink power control parameter configuration method according to claim 12, wherein the target indication field is coded independently, or the target indication field is jointly coded with other indication field;
wherein prior to the sending the DCI carrying the target indication field to the terminal in the case that the target indication field is coded independently, the method further comprises:
sending, to the terminal, indication information configured to indicate whether the DCI comprises a target indication field.

14. The uplink power control parameter configuration method according to claim 11, wherein prior to the receiving the uplink channel or the uplink reference signal sent by the terminal at the target transmit power, the method further comprises:
sending, to the terminal, an association relationship among a plurality of power control parameter items in the power control parameter set.

15. The uplink power control parameter configuration method according to claim 11, wherein the power control parameter item is one of: a target received power, a path loss compensation factor, a reference resource identification of a downlink channel or a reference signal for a pathloss calculation and a process identification of a closed-loop power control;
or,
the uplink channel comprises at least one of a Physical Uplink Control Channel (PUCCH), a Physical Uplink Shared Channel (PUSCH), and a Physical Random Access Channel (PRACH), and the uplink reference signal comprises a Sounding Reference Signal (SRS).

16. A network device, comprising a processor, a memory and a computer program stored in the memory and executable on the processor, wherein the processor executes the computer program to perform the uplink power control parameter configuration method according to claim 11.

* * * * *